(12) United States Patent
Brooks et al.

(10) Patent No.: US 8,977,670 B2
(45) Date of Patent: *Mar. 10, 2015

(54) PROCESSOR PIPELINE WHICH IMPLEMENTS FUSED AND UNFUSED MULTIPLY-ADD INSTRUCTIONS

(75) Inventors: Jeffrey S. Brooks, Austin, TX (US); Christopher H. Olson, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/469,212

(22) Filed: May 11, 2012

(65) Prior Publication Data
US 2012/0221614 A1 Aug. 30, 2012

Related U.S. Application Data

(63) Continuation of application No. 12/057,894, filed on Mar. 28, 2008, now Pat. No. 8,239,440.

(51) Int. Cl.
*G06F 7/38* (2006.01)
*G06F 7/483* (2006.01)
*G06F 7/544* (2006.01)

(52) U.S. Cl.
CPC .............. *G06F 7/483* (2013.01); *G06F 7/5443* (2013.01); *G06F 2207/3884* (2013.01)
USPC .......................................... 708/501; 708/523

(58) Field of Classification Search
USPC .................. 708/501, 505, 523, 670, 706–713
See application file for complete search history.

(56) References Cited

U.S. PATENT DOCUMENTS

| | | | | |
|---|---|---|---|---|
| 5,150,320 A | * | 9/1992 | Nakayama | 708/503 |
| 5,909,385 A | * | 6/1999 | Nishiyama et al. | 708/630 |
| 5,957,997 A | * | 9/1999 | Olson et al. | 708/205 |
| 5,993,051 A | * | 11/1999 | Jiang et al. | 708/501 |
| 6,275,838 B1 | | 8/2001 | Blomgren et al. | |
| 6,460,134 B1 | | 10/2002 | Blomgren et al. | |
| 6,542,915 B1 | * | 4/2003 | Dibrino et al. | 708/501 |

(Continued)

OTHER PUBLICATIONS

L. Huang, L. Shen, K. Dai and Z. Wang, "A New Architecture for Multiple-Precision Floating-Point Multiply-Add Fused Unit Design," Proc. 18th IEEE Symp. Computer Arithmetic (ARITH '07), pp. 69-76, 2007.*

(Continued)

*Primary Examiner* — Chuong D Ngo
*Assistant Examiner* — Matthew Sandifer
(74) *Attorney, Agent, or Firm* — Meyertons Hood Kivlin Kowert & Goetzel (57) ABSTRACT

Implementing an unfused multiply-add instruction within a fused multiply-add pipeline. The system may include an aligner having an input for receiving an addition term, a multiplier tree having two inputs for receiving a first value and a second value for multiplication, and a first carry save adder (CSA), wherein the first CSA may receive partial products from the multiplier tree and an aligned addition term from the aligner. The system may include a fused/unfused multiply add (FUMA) block which may receive the first partial product, the second partial product, and the aligned addition term, wherein the first partial product and the second partial product are not truncated. The FUMA block may perform an unfused multiply add operation or a fused multiply add operation using the first partial product, the second partial product, and the aligned addition term, e.g., depending on an opcode or mode bit.

17 Claims, 7 Drawing Sheets

(56) References Cited

U.S. PATENT DOCUMENTS

| | | | |
|---|---|---|---|
| 6,542,916 | B1 | 4/2003 | Hinds et al. |
| 6,557,021 | B1 | 4/2003 | Brooks et al. |
| 6,591,286 | B1 * | 7/2003 | Lu .............................. 708/672 |
| 6,889,241 | B2 | 5/2005 | Pangal et al. |
| 7,080,111 | B2 | 7/2006 | Pangal et al. |
| 7,099,910 | B2 | 8/2006 | Brooks et al. |
| 7,392,273 | B2 | 6/2008 | Gerwig et al. |
| 7,680,874 | B2 * | 3/2010 | Takegama et al. ............ 708/710 |
| 7,730,117 | B2 | 6/2010 | Fleischer et al. |
| 7,912,887 | B2 | 3/2011 | Dockser et al. |
| 8,046,399 | B1 | 10/2011 | Inaganti et al. |
| 8,239,441 | B2 | 8/2012 | Rarick et al. |
| 2005/0228844 | A1 | 10/2005 | Dhong et al. |
| 2007/0266071 | A1 * | 11/2007 | Dockser et al. ............... 708/495 |
| 2009/0077152 | A1 * | 3/2009 | Powell et al. ................. 708/501 |
| 2009/0287757 | A1 * | 11/2009 | Rarick .......................... 708/523 |
| 2010/0100713 | A1 * | 4/2010 | Boersma et al. .............. 712/222 |

OTHER PUBLICATIONS

R.V.K. Pillai, S.Y.A. Shah, A.J. Al-Khalili, and D. Al-Khalili, "Low Power Floating Point MAFs—A Comparative Study," Sixth International Symposium on Signal Processing and its Applications, vol. 1, pp. 284-287, 2001.*

E. Quinnell, E.E. Swartzlander and C. Lemonds, "Floating-Point Fused Multiply-Add Architectures" Proc. 41st Asilomar Conf. Signals, Systems, and Computers, pp. 331-337, 2007.*

Quinnell, Eric Charles; "Floating-Point Fused Multiply-Add Architectures," Chapter 2, PhD Dissertation at University of Texas at Austin, May 2007, pp. 1-46.

Lang, T.; Bruguera, J. D.; "Floating-Point Fused Multiply-Add with Reduced Latency," Proceedings of the 2002 IEEE International Conference on Computer Design: VLSI in Computers and Processors, pp. 145-150, 2002.

Hokenek et al.; "Second-Generation RISC Floating Point with Multiply-Add Fused;" IEEE Journal of Solid-State Circuits, vol. 25, pp. 1207-1213, 1990.

Naini et al.; "1 GHz HAL Sparc64 Dual Floating Point Unit with RAS Features," Proceedings of the 15th Symposium on Computer Arithmetic, pp. 173-183, 2001.

Schmookler, Martin S.; Nowka, Kevin J.; "Leading Zero Anticipation and Detection—A Comparison of Methods"; Proceedings of the 15th IEEE Symposium on Computer Arithmetic; 2001, pp. 7-12.

* cited by examiner

| Stage | Multiply-add Action |
|---|---|
| FX1 | Format input operands |
| FX2 | Align B with AxC product / Booth encoder |
| | Generate partial products using a radix-4 Booth algorithm |
| FX3 | Invert aligned B if a logical (effective) subtraction is to be performed / Accumulate AxC partial products using a Wallace tree configuration |
| FX4 | |
| FX5 | Determine normalization shift amount / Compute intermediate result (AxC+B) by adding the two Wallace tree outputs with the aligned B |
| FX6 | Invert intermediate result if a negative result is detected / Unfused intermediate round |
| FX7 | Normalize |
| FX8 | Round |
| FB | Bypass |

```
Example A
A*C product=01.XXXXXXXX_XXXXXXXX_XXXXXXXX_XXXXXXXX_XXXXXXXX_XXXXXX
B unmasked = X.XXXXXXXX_XXXXXXXX_XXXXXXX
B masked   = X.XXXXXXXX_XXXXXXXX_XXXXXXX0_00000000_00000000_000000
                                       Q G |<---- sticky region --->
```

```
Example B
A*C product=01.XXXXXXXX_XXXXXXXX_XXXXXXXX_XXXXXXXX_XXXXXXXX_XXXXXX
B unmasked =      XXXXXX_XXXXXXXX_XXXXXXXX_XX
B masked   =      XXXXXX_XXXXXXXX_XXXXXXX0_00000000_00000000_000000
                                       Q G |<---- sticky region --->
```

FIG. 6

PROCESSOR PIPELINE WHICH IMPLEMENTS FUSED AND UNFUSED MULTIPLY-ADD INSTRUCTIONS

FIELD OF THE INVENTION

This application is a continuation of U.S. patent application Ser. No. 12/057/894 titled "Processor which Implements Fused and Unfused Multiply-Add Instructions in a Pipelined Manner" filed Mar. 28, 2008, now U.S. Pat. No. 8,239,440 whose inventors were Jeffrey S. Brooks and Christopher H. Olson, which is hereby incorporated by reference in its entirety as though fully and completely set forth herein.

FIELD OF THE INVENTION

The present invention relates to the field of processor architecture, and more particularly to a system and method for implementing fused and unfused multiply-add instructions in a pipelined manner.

DESCRIPTION OF THE RELATED ART

In the computation of the multiply add operation A*C+B, where A, B, and C are floating point numbers, rounding is accomplished utilizing one of two techniques. The first technique is termed fused multiply-add rounding, and the second technique is termed unfused multiply-add rounding.

Figure 1:
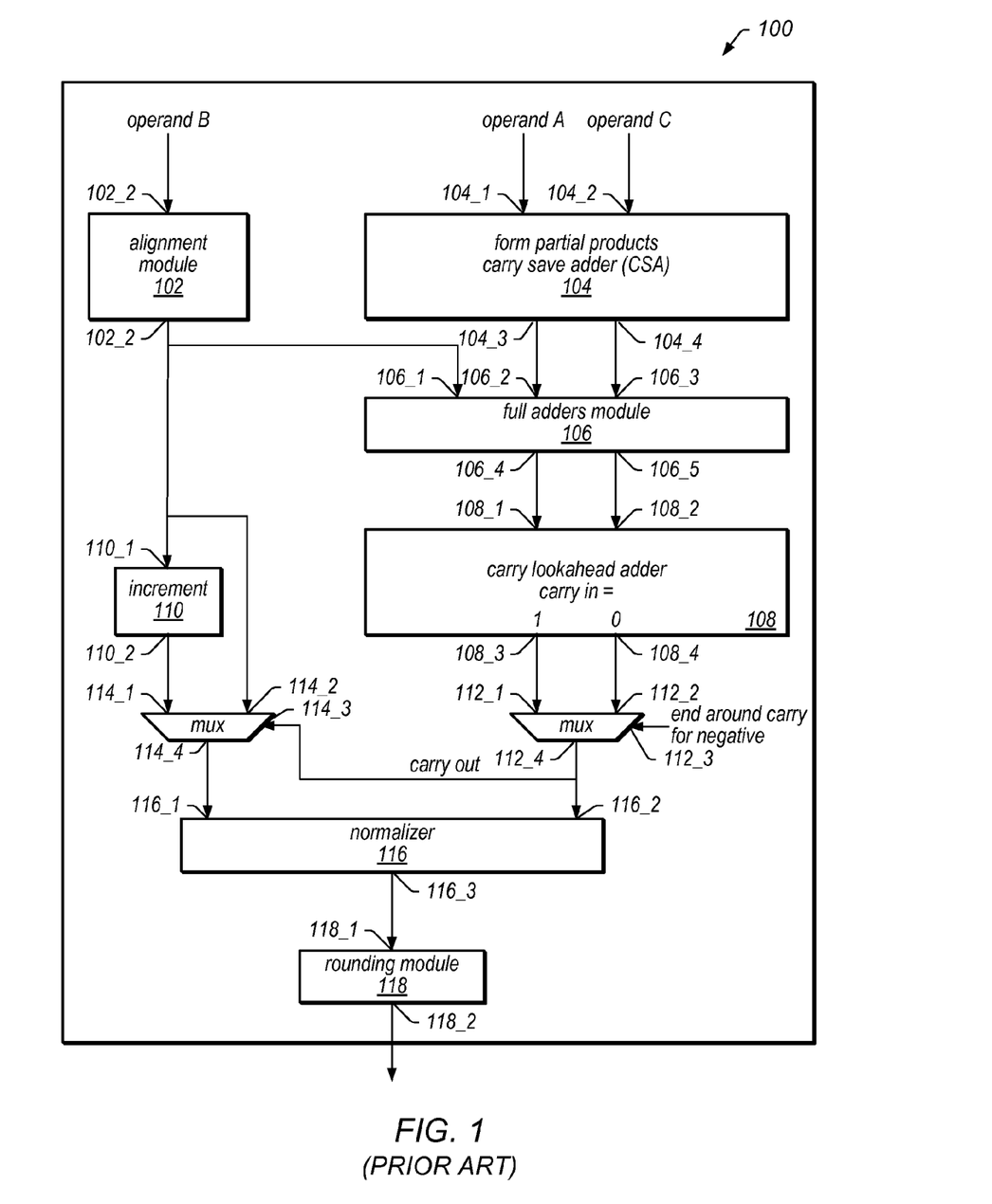
FIG. 1 illustrates an exemplary embodiment of a fused multiply-add pipeline according to the prior art.

FIG. 1 illustrates a conventional floating point multiply-add module 100 utilizing conventional fused multiply-add rounding. In FIG. 1, a mantissa of an operand A is input to a carry save adder (CSA) 104 at an input 104_1, and a mantissa of an operand C is input to CSA 104 at an input 104_2. The partial products of the operation A*C are formed and reduced in CSA 104 until two partial products, term S and term T, remain. In the present example, term S is output from CSA 104 at 104_3, and term T is output from CSA 104 at output 104_4. In parallel with the operation of CSA 104, a mantissa of an operand B is input to an alignment module 102 at an input 102_1, and the binary point of the mantissa of operand B is aligned with a position of a binary point of the product of A*C. The resultant aligned B term is output from alignment module 102 at output 102_2.

Term S, term T, and the portion of the aligned B term that is not larger than the product of A*C are input to a full adders module 106, respectively at inputs 106_2, 106_3, and 106_1, and combined in full adders of FA module 106 to produce two resulting new terms, term X and term Y. Term X is output from FA module 106 at output 106_4, and term Y is output from FA 106 at output 106_5.

Term X and term Y are next input to a carry lookahead adder (CLA) 108, respectively at inputs 108_1 and 108_2. Term X and term Y are added in CLA 108 to produce two resultant sums, a first sum for a carry-in of zero, termed Sum C0, and a second sum C1. Sum C0 is output from CLA 108 at output 108_4 and Sum C1 is output from CLA 108 at output 108_3.

The portion of the aligned B mantissa that is larger than the product of A*C, output from alignment module 102 at output 102_2, is input to an increment module 110 at input 110_1 and incremented in increment module 110. The incremented term output from increment module 110 at output 110_2 is input to mux 114 at input 114_1 together with the unincremented aligned C term input to mux 114 at input 114_2.

The Sum C0 term output from CLA 108 is input to mux 112 at input 112_2 together with the Sum C1 term input at input 112_1. Initially, the value of zero is used as input at input 112_3. The resultant carry out of mux 112 at output 112_4 is then input to mux 114 at input 114_3 and is used to select the incremented or unincremented high order bits, i.e., the bits that are in positions larger than the positions for the product of A and C, in mux 114. The initially selected high order bits are then output from mux 114 at output 114_4.

The resultant carry out from mux 114 is termed the end around carry. The end around carry is then used as the carry in to CLA 108, which is accomplished by replacing the initial input of zero at input 114_3 to mux 114 with the end around carry value. After this replacement, the output from mux 112 at output 112_4 becomes the input to normalizer module 116 at input 116_2. The carry out from mux 112 at output 112_4 is input to mux 114 at input 114_3 and used to select the incremented or unincremented high order bits.

The selected high order bits output from mux 114 are then input to normalizer 116 at input 116_1 together with the resultant carry out of mux 112 input to normalizer 116 at input 116_2.

Normalizer 116 normalizes the values and outputs the normalized value at output 116_3. The normalized value is input to a rounding module 118 at input 118_1 where the normalized value is rounded and the fused multiply-add rounding result is output from rounding module 118 at output 118_2.

The above summarizes a conventional floating point multiply-add module which performs fused multiply add operations. However, these multiply-add modules are unable to additionally perform unfused multiply add operations. Accordingly, improvements in processors and multiply-add modules are desired.

SUMMARY OF THE INVENTION

Various embodiments are presented of a system and method for implementing an unfused multiply-add instruction within a fused multiply-add pipeline.

In some embodiments, the system, e.g., a fused-unfused floating point multiply-add (FMA) pipeline, may include an aligner having an input for receiving an addition term. The aligner may be configured to produce an aligned addition term. The system may further include a multiplier tree having two inputs for receiving a first value and a second value for multiplication. The multiplier tree is configured to produce a first partial product and a second partial product. The system may include a first carry save adder (CSA). The first CSA may be configured to receive the first partial product, the second partial product, and the aligned addition term, and may be configured to produce first and second CSA terms.

The system may include a leading zero anticipator (LZA). The LZA may be configured to receive the aligned addition term and the first and second CSA terms and to determine the number of leading zeroes or ones within the sum of the terms. The addition term may not be truncated before being provided to the LZA.

The system may further include a fused/unfused multiply add (FUMA) block configured to receive the first partial product, the second partial product, and the aligned addition term. The first partial product and the second partial product may not be truncated. The FUMA block may be configured to perform an unfused multiply add operation or a fused multiply add operation (e.g., based on an opcode or a mode setting or bit, among other possibilities) using the first partial product, the second partial product, and the aligned addition term to produce a multiply add intermediate result. In one embodiment, the addition term may be truncated before reception by the FUMA block when performing the unfused multiply add operation, and the addition term may not be truncated when performing the fused multiply add operation.

The FUMA block may include a second CSA, a half-adder, and/or a plurality of carry propagate adders (CPAs), among other possibilities. For example, in one embodiment, the FUMA block may include a second CSA. The second CSA may be configured to receive the first partial product, the second partial product, and the aligned addition term and produce third and fourth CSA terms. The FUMA block may further include a half adder configured to receive the third and fourth CSA terms and produce first and second half-adder terms. The FUMA block may include a first carry propagate adder (CPA) configured to receive the first and second half-adder terms and provide a first CPA sum. The FUMA block may include a second CPA configured to receive the third and fourth CSA terms and provide a second CPA sum.

The system may further include control logic (e.g., a sum select logic block). The control logic may be configured to select and/or modify outputs from the FUMA block in a first manner when performing the unfused multiply add operation and in a second manner when performing the fused multiply add operation.

In one embodiment, a processor may include a FUMA pipeline, where the FUMA pipeline is configured for receiving a first multiply term, a second multiply term, and an addition term. In response to the processor receiving a single fused multiply-add opcode, the fused-unfused FUMA pipeline may be configured to generate a fused multiply-add rounding result. In response to the processor receiving a single unfused multiply-add opcode, the FUMA pipeline may be configured to generate an unfused rounding result.

In generating the unfused rounding result, the FUMA pipeline may be configured to, instead of generating the product of the first multiply term and the second multiply term, generate a first terminal partial product and a second terminal partial product from the first multiply term and the second multiply term. In some embodiments, the first terminal partial product and the second terminal partial product may not be truncated.

Additionally, in generating the unfused rounding result, the FUMA pipeline may be configured to align the addition term to generate an aligned addition term before being combined with the first terminal partial product and the second terminal partial product. However, in generating the unfused rounding result, the FUMA pipeline may be configured to truncate the aligned addition term.

The FUMA pipeline may be configured to combine the aligned addition term with the first terminal partial product and the second terminal partial product to determine the number of leading zeros or ones within the sum of the terms, e.g., using an LZA as above. However, in one embodiment, in determining the number of leading zeros or ones, the aligned addition term may not be truncated.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. patent application Ser. No. 12/020,486, titled "Fused Multiply-Add Rounding and Unfused Multiply-Add Rounding in a Single Multiply-Add Module", whose inventors are Murali K. Inaganti and Leonard D. Rarick.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Fused Multiply-Add—multiplication of a first two values and addition of a third value without intermediate rounding. The instruction is a "fused" operation; no rounding is performed between the multiplication operation and the subsequent addition (or subtraction). Therefore, at most, one rounding step occurs.

Unfused Multiply-Add—multiplication of a first two values followed by rounding and addition of a third value followed by a second rounding. The instruction is treated as distinct (unfused) multiply and add/subtract operations, with rounding (e.g., according to IEEE Std. 754-1985) performed after each of the two operations.

Half Adder—a single bit adder that has two inputs, generally labelled A and B, and two outputs, the sum S and carry C. S is the two-bit XOR of A and B, and C is the AND of A and B.

Full Adder—a single bit adder that takes into account a carry input such that multiple adders can be used together to add larger numbers.

Carry Save Adder (CSA)—a type of digital adder used in computer microarchitecture to compute the sum of three or more n-bit numbers in binary. A carry-save adder differs from other digital adders in that it outputs two numbers of the same dimensions as the inputs, one which is a sequence of partial sum bits and another which is a sequence of carry bits.

Carry Propagate Adder (CPA)—an adder that is not a CSA. A propagate adder may propagate its carriers using ripples, carry lookahead or other methods.

Carry Look-Ahead Adder—a specific CPA implementation used to speed up addition.

Leading Zero Anticipator (LZA)—A circuit typically used in an adder for calculating the number of leading zeros for operand normalization purposes. An LZA circuit may also be used to perform a partial sum zero detection in multiply operations.

Wallace Tree—an efficient hardware implementation of a digital circuit that multiplies two integers. The Wallace tree has three steps:

1. Multiply (that is—AND) each bit of one of the arguments, by each bit of the other, yielding $n^2$ results. Depending on position of the multiplied bits, the wires carry different weights, for example wire of bit carrying result of $a_2 b_3$ is 32 (see explanation of weights below)

Figure 2:
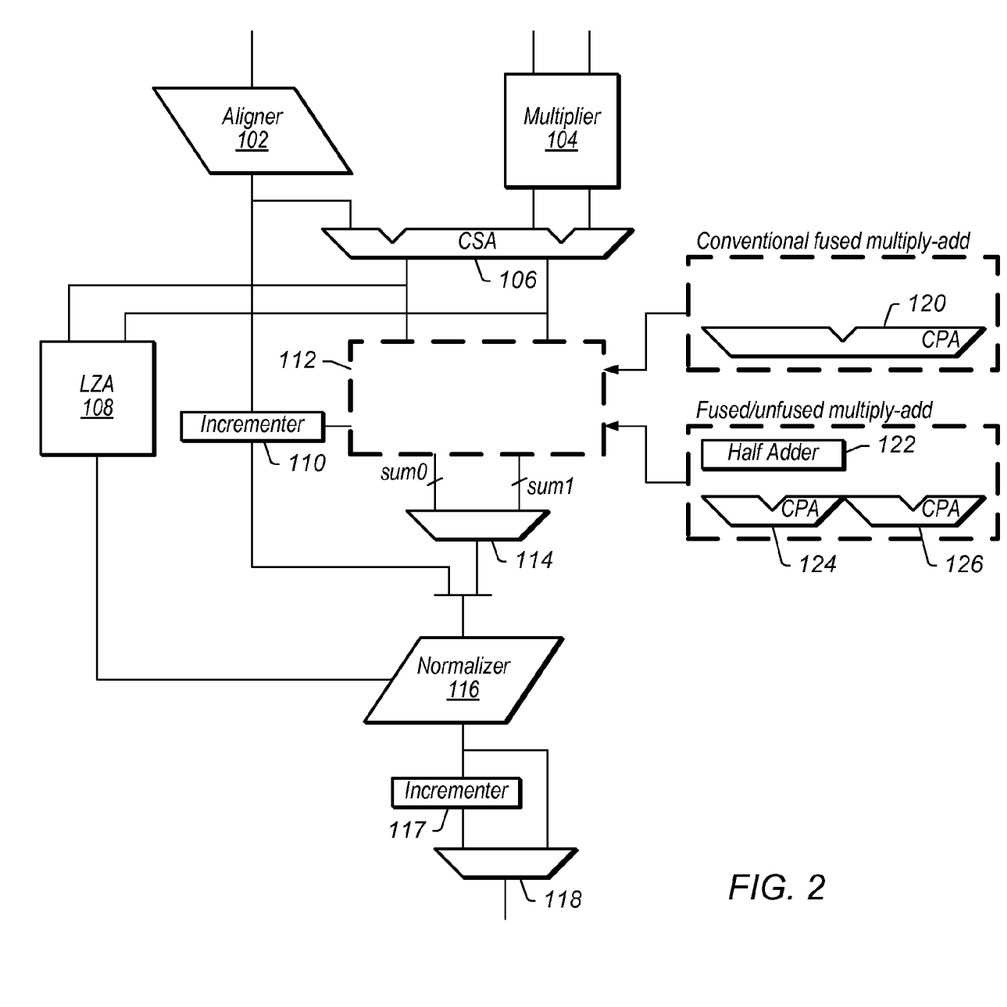
FIG. 2 is a general block diagram of a fused-unfused multiply-add pipeline, according to one embodiment.
Figure 3A:
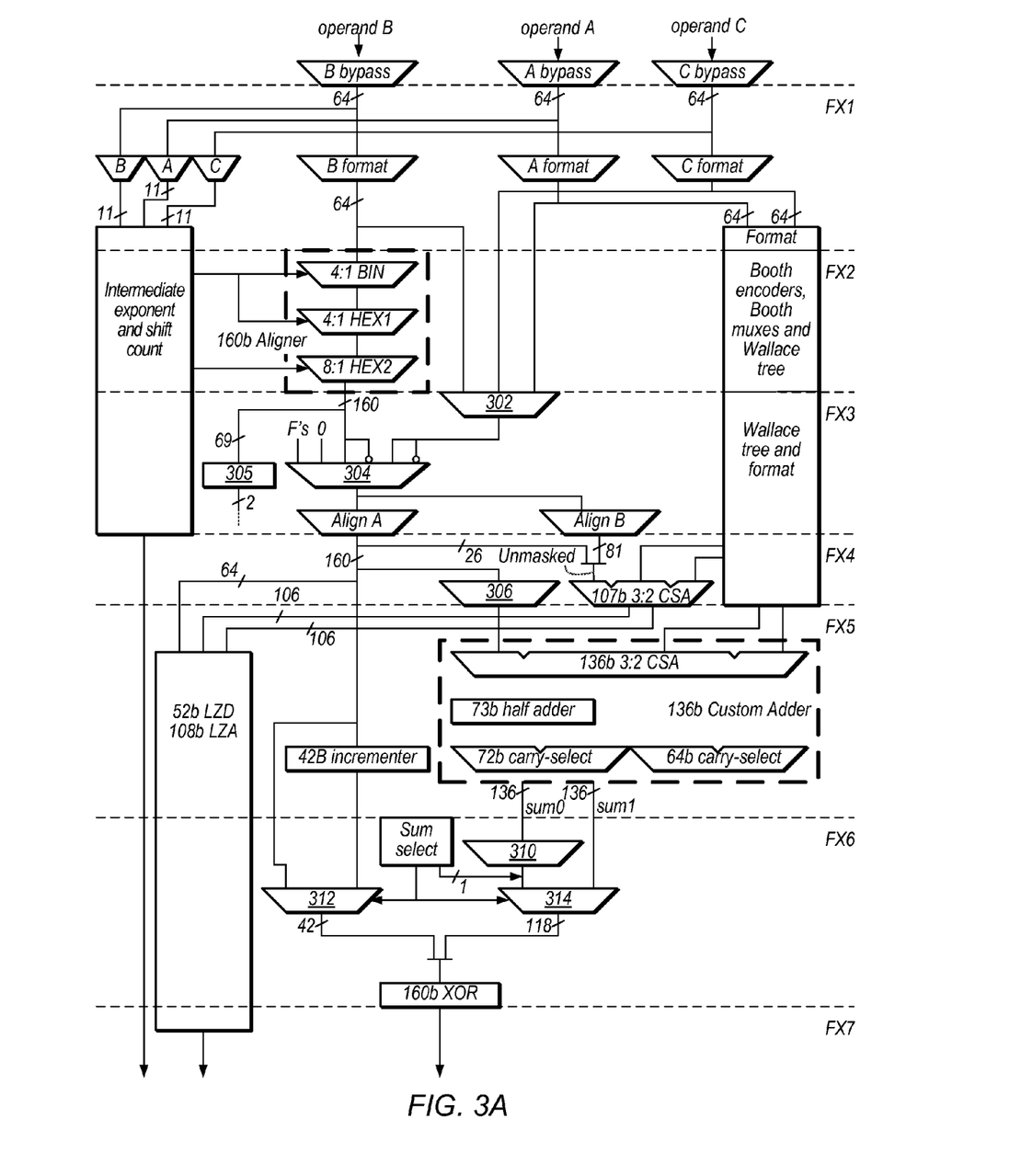
FIGS. 3A and 3B are a more specific block diagram of the fused-unfused multiply-add pipeline of FIG. 2, according to one embodiment.
Figure 3B:
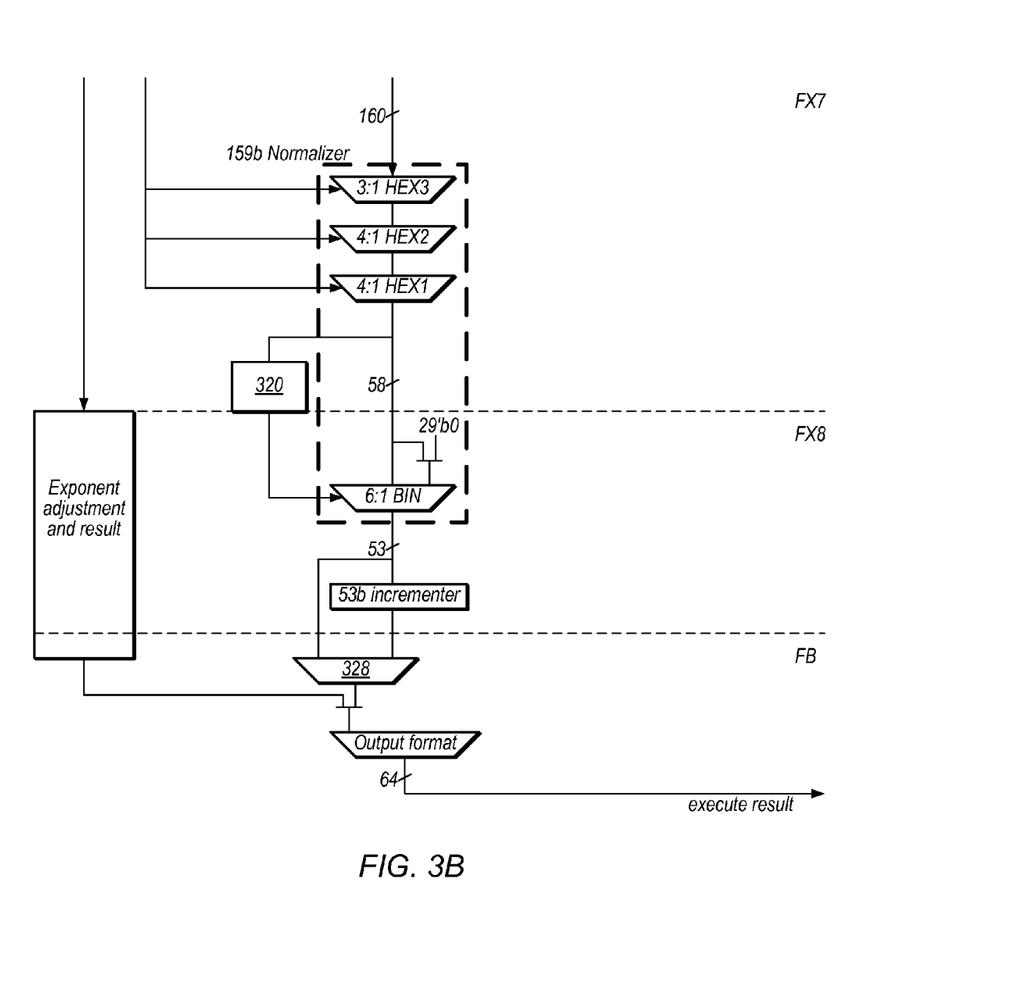

2. Reduce the number of partial products to two by layers of full and half adders 3. Group the wires in two numbers, and add them with a conventional adder FIGS. 2-4—Exemplary Fused-Unfused Multiply Add Pipeline FIG. 2 is a block diagram representing one embodiment of a fused-unfused multiply add (FUMA) pipeline block diagram. FIGS. 3A and 3B provide a more detailed block diagram of the FUMA pipeline, and FIG. 4 is a table summarizing pipeline stages of the FUMA pipeline.

U.S. patent application Ser. No. 12/020,486 ("the '486 Application), which was incorporated in its entirety above, provides one implementation of a FUMA pipeline. However, the FUMA of the '486 Application has some drawbacks which the FUMA pipeline described herein avoids. For example, truncation of partial products from the Wallace tree of the '486 Application's FUMA pipeline and modification of the LZA is not required in the present FUMA pipeline. Furthermore, timing pressures on the LZA is reduced by removing a half-adder from the critical path of the '486 Application's FUMA. Further improvements over the FUMA of the '486 Application will become apparent to those of skill in the art after reading the following descriptions of the present FUMA pipeline.

Figure 4:
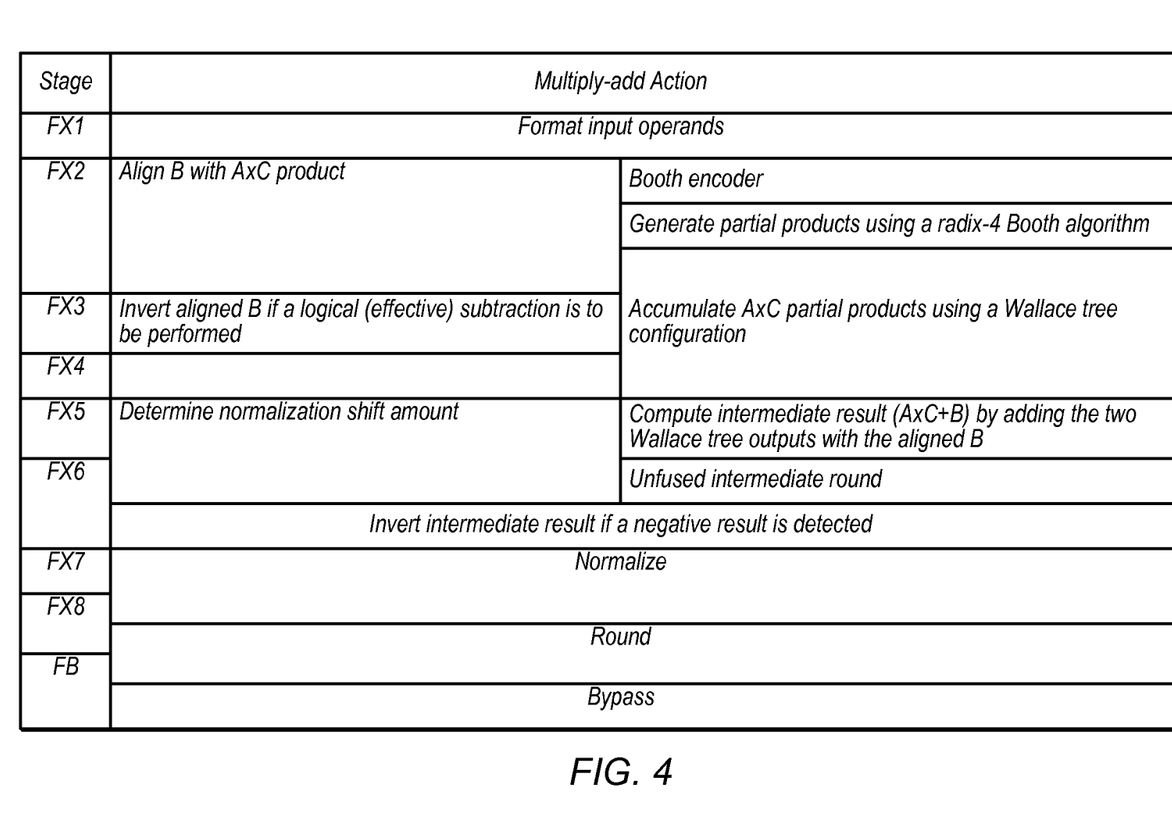
FIG. 4 is a table summarizing pipeline stages of the fused-unfused multiply-add pipeline of FIGS. 3A and 3B, according to one embodiment.

It should be noted that the FUMA pipeline of FIGS. 2-4 may be included in any of various processing units, as desired. For example, the FUMA pipeline may be included in a CPU of various types, including an x86 processor, e.g., a Pentium class, a PowerPC processor, a CPU from the SPARC family of RISC processors, as well as others. Other processor types such as microprocessors are envisioned. The processor may be included in a computer system which may include a memory medium, typically comprising RAM and referred to as main memory, which may be coupled to a host bus by means of memory controller. The main memory may store an operating system as well as application programs, etc., as well as other software for operation of the computer system. One or more of the software programs may cause the processor to execute fused and/or unfused multiply-add instructions as described herein. The computer system will typically have various other devices/components, such as other buses, memory, peripheral devices, a display, etc.

As shown in FIG. 2, aligner 102 may receive an addition term as input and provide outputs to CSA 106 and incrementor 110. Multiplier 104 (e.g., a Wallace tree or other multiplier) may receive two terms for multiplication and provide two outputs (e.g., partial products) to the CSA 106. The CSA 106 may provide two outputs to LZA 108 as well as a FUMA block including half adder 122, CPA 124, and CPA 126. As also shown, a conventional FMA block may only include CPA 120. The output from the FUMA block (labeled sum0 and sum1) may be selected by mux 114. The output from mux 114 and incrementor 110 may be provided to normalizer 116 (which may also receive output from LZA 108). Normalizer 116 may provide output to incrementor 117 and to mux 118 in parallel with output from incrementor 117. Mux 118 may provide the appropriate output.

In the following descriptions, exemplary bitwidths for registers, circuit elements, and values are provided; however, it should be noted that in various embodiments, these values may be modified, as desired. For example, while the implementation described below includes a 136 bit main adder (e.g., for supporting cryptography functions) other implementations may include 128 bit or approximately 106 bit main adders.

As shown in FIG. 3, an addition term B, and two multiplier terms A and C may be provided to the FUMA pipeline, e.g., as 64 bit values, and selected by B bypass, A bypass, and C bypass.

In FX1, outputs from B bypass, A bypass, and C bypass may be provided to multiplexers (muxes) B, A, and C, which may provide outputs (e.g., 11 bit outputs) to the intermediate exponent and shift count block of FIG. 3A. In parallel the outputs from B bypass, A bypass, and C bypass may be provided to B format, A format, and C format blocks.

In FX2, addition term B may be aligned with the A*C product, and terms A and C may be booth encoded to produce partial products, e.g., using a radix-4 Booth algorithm. More specifically, the output from B format (e.g., 64 bits) may be provided to 4:1 BIN mux with output from the Intermediate exponent and shift count block. The output from the 4:1 BIN mux may be provided to 4:1 HEX1 mux with output from the Intermediate exponent and shift count block. The output from 4:1 HEX1 mux may be provided to 8:1 HEX2 mux with output from the intermediate exponent and shift count block. In parallel, the output (e.g., 64 bits) from A format and C format may be provided for Booth formatting and processed by Booth encoders, Booth muxes, and Wallace tree processing. Wallace tree processing and formatting may continue through FX3 and FX4.

In FX3, the aligned B may be inverted if a logical (e.g., effective) subtraction is to be performed. More specifically, outputs (e.g., 64 bit) from B format, A format, and C format may be provided to mux 302, whose output may be provided to mux 304. Mux 304 may also receive input (e.g., 160 bits) from 8:1 HEX2 mux. The output of mux 304 may be provided to align format block A and align format block B. Additionally, the output of 8:1 HEX2 mux may be provided to block 305 which may determine sticky bits later used for rounding determination by the sum select block in FX6.

In FX4, the output from Align A may be provided to mux 306 which may determine whether or not to truncate the aligned addition term, e.g., depending on whether an unfused or fused multiply add should be performed. For example, in one embodiment, depending on an opcode or mode setting or bit (which may vary based on the desired multiply add instruction type), the mux 306 may truncate (or mask) the output from Align A. The opcode or mode setting described above may simply indicate which kind of operation (or more specifically, which kind of multiply-add operation) should be performed. However, other variations are envisioned and any type of indication that is usable to determine whether the multiply add should be fused or unfused may be implemented. More specifically, if the multiply add is unfused, the mux 306 may truncate the output from Align A. Additionally, in FX4, the output from Align B (e.g., 81 bits) may be combined with a branched output from Align A (e.g., 26 bits) and provided to 107 bit 3:2 CSA with two partial product outputs from the Wallace tree.

In FX5, normalization shift amount may be determined, and intermediate results of the multiply add (A*C+B) may be computed by adding the two Wallace tree outputs with the aligned B. More specifically, the output from mux 306 and the two partial products from the Wallace Tree may be provided to the 136 bit 3:2 CSA of the FUMA block outlined in dotted lines. However, it should be noted that the first partial product and the second partial product from the Wallace tree may not be truncated. The outputs of the 3:2 CSA may be provided to a 73 bit half adder as well as a 64 bit carry select adder. The outputs of the 73 bit half adder may be provided to the 72 bit carry select adder. The 72 bit carry select adder (or carry propagate adder) may provide outputs corresponding to the upper portion from the 136 bit 3:2 CSA (via the half adder) and the 64 bit carry select adder may provide outputs corresponding to the lower portion from the 136 bit 3:2 CSA. The sum0 and sum1 may be provided as output. Note that while the elements of the FUMA block are shown as a single CSA, a half adder, and two carry select adder blocks, the FUMA block may simply include a CSA, a half adder, and a plurality of carry select adders or carry propagate adders. In other words, the shown embodiment is exemplary only and other configurations of the FUMA block are envisioned.

Additionally in FX5, the outputs from the 107 bit 3:2 CSA may be provided to the 108 bit LZA (received as two 106 bit inputs and representing an untruncated Align A output) in addition to the untruncated 64 bit output from Align A. Note that the addition term may not be truncated before being provided to the LZA. The LZA may be configured to determine the number of leading zeroes or ones within the sum of the terms. Further, the output from Align A may be provided to the 42 bit incrementor shown. Thus, the LZA (and possibly the normalizer) may receive a bypassed version of the unmasked B mantissa.

In FX6, the unfused intermediate round may be performed if necessary. More specifically, control logic of the sum select block may determine how to perform rounding. More specifically, the sum select block may act in a first manner if an unfused multiply add is to be performed and in a second manner if a fused multiply add is to be performed (e.g., based on an opcode or mode bit, among other possibilities). For example, the sum select control block may receive input from Align A which may allow B to be properly accounted for within the masked positions when determining the proper output and the A*C+B intermediate mantissa G position and sticky bits.

Additionally, the sum select control block may receive input from block 305 to receive sticky bit information. More specifically, masking B may necessitate unique sticky bit gathering for B mantissa bits shifted by the aligner past the A*C product upper bits (specifically, past the G position assuming format 01.XX) but not shifted past the full A*C product.

The sum select block may also receive input from the FUMA block. More specifically, because B may not be masked in the Q bit position, an independent one bit full adder may be used to calculate this position with B masked to properly determine, without pollution from B, whether an unfused intermediate round increment is needed for A*C product format 1X.XX.

Additionally, the A*C product may be masked from participating in normalization in all bit positions to the right of and including the A*C product Q position. This may ensure that the A*C product does not pollute determination of the final round increment. The A*C product may be masked in these positions via the existing 310 mux. Because the normalizer may require a bypassed version of the unmasked B mantissa, the A*C product may be simply replaced with the unmasked B mantissa within the appropriate positions.

Furthermore, the sum select may receive input from the 42 bit incrementor and/or muxes 310 (e.g., which may provide an unmasked B mantissa) and 314 (among other possibilities) to determine proper rounding output of the multiply add. For example, where an unfused add is to be performed, the sum select block may operate to round the output using the sum0 and sum1 of the carry select adders in the FUMA block.

In one embodiment, the bit width division of the carry select adders may determine where rounding occurs (in this case, 72 bit upper portion rounding). Where a fused multiply add should occur (e.g., based on the opcode or mode bit, among other possibilities), the sum select block may select the appropriate sum that does not have intermediate rounding.

Figure 6:
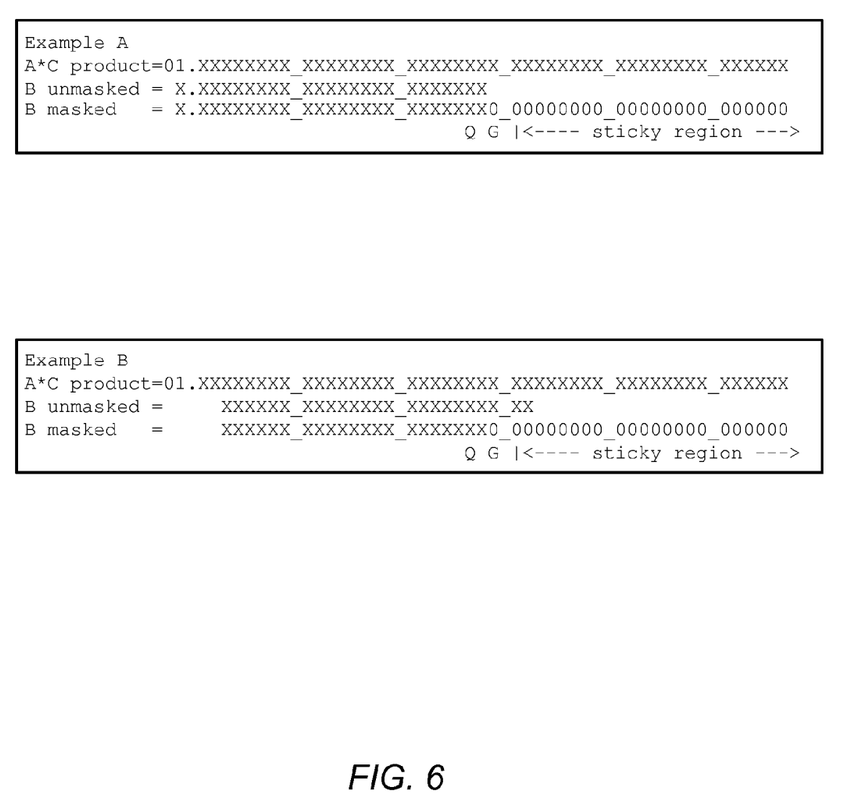
FIG. 6 are two examples corresponding to FIGS. 4 and 5, according to one embodiment.

Specific single precision examples indicating the location of the intermediate mantissa G position and sticky region is provided in FIG. 6 as Examples A and B. In Example A, the A*C product format is 01.XX and the A*C exponent equals B exponent. In Example B, the A*C product format is 01.XX and the A*C exponent minus B exponent equals 3. In one embodiment, B may be properly accounted for within the masked positions when determining the proper output and the A*C+B intermediate mantissa G position and sticky bits.

With specific regard to illustrated connectivity in stage FX6, sum0 of the carry select adders and the unmasked value of the B mantissa (shown below Align B) may be provided to mux 310 and sum1 and the output of mux 310 may be provided to mux 314. The 42 bit incrementor output as well as the output of align A may be provided to mux 312. The 42 bit output from mux 312 and the 118 bit output from mux 314 may be provided to the 160 bit XOR block.

In FX7, the result of the multiply add may be normalized. More specifically, the output of the 160 bit XOR block and the output from the LZA may be provided to 3:1 HEX3 mux. The output from 3:1 HEX3 mux and the output from the LZA may be provided to 4:1 HEX2 mux. The output from 4:1 HEX2 mux may be provided to 4:1 HEX1 mux with the output from the LZA. The output from 4:1 HEX1 mux may be provided to block 320.

In FX8, the normalized result may be rounded. More specifically, the output from the 4:1 HEX1 mux may be provided to a 6:1 BIN mux with the output from block 320. The output of the 6:1 BIN mux may be provided to a 53 bit incrementor. In parallel, the output from intermediate exponent and shift count may be provided to exponent adjustment and result block.

In FB, rounding may be completed and the execute result bypassed. More specifically, the output from 6:1 BIN mux and the 53 bit incrementor may be combined with the output from the exponent adjustment and result to output format mux. Finally, the 64 bit output of the output format mux may be provided as an execute result.

Figure 5:
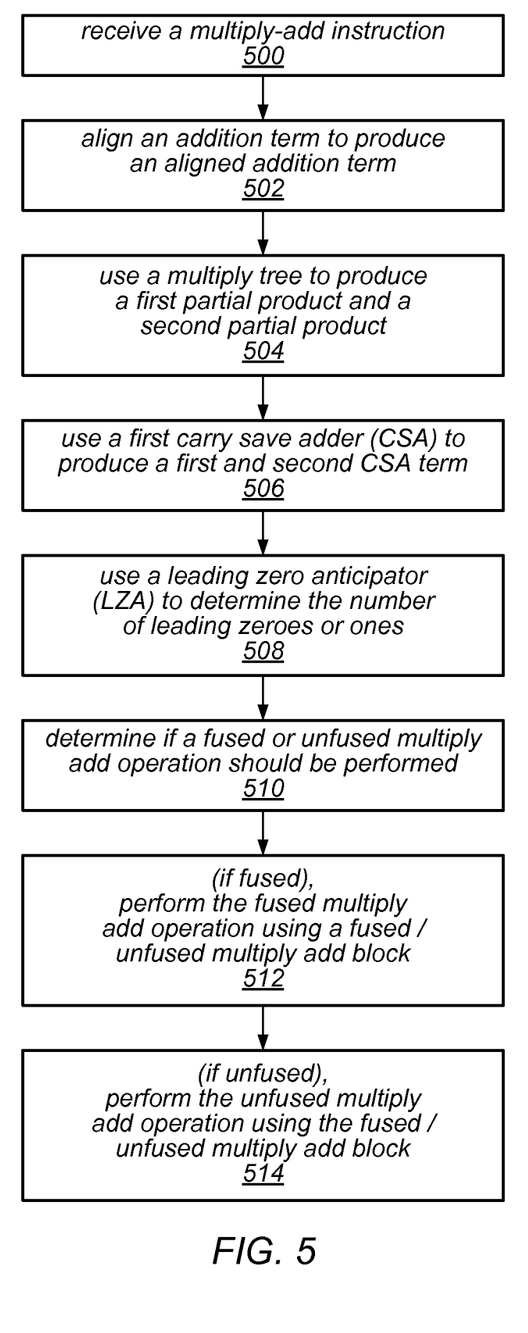
FIG. 5 is a flowchart illustrating a method for operating a fused-unfused multiply add pipeline, according to one embodiment.

FIG. 5—Method of Operation of a FUMA Pipeline

FIG. 5 is a block diagram illustrating one embodiment of a multiply-add pipeline. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 500, a multiply add instruction may be received. A mode setting or mode bit may be set when the multiply add instruction is received, e.g., for determining whether the multiply add instruction should be performed in a fused or unfused manner. Alternatively, or additionally, an opcode may be used for this determination, in 510. However, the determination or setting of the mode may be performed at later points, as desired.

In 502, an addition term (e.g., term B from above) may be aligned to produce an aligned addition term.

In 504, a multiply tree (e.g., a Wallace tree) may be used to produce a first partial product and a second partial product from a first multiply term and a second multiply term (e.g., terms A and C from above).

In 506, a first carry save adder (CSA) may be used to produce a first and second CSA term from the first partial product and the second partial product of the multiply tree.

In 508, a leading zero anticipator (LZA) may be used to determine the number of leading zeroes or ones within the sum of the aligned addition term and the first and second CSA terms. Note that the addition term may not be truncated before using the LZA.

In 510, it may be determined if a fused or unfused multiply add operation should be performed, e.g., using the mode bit, mode setting, or opcode indicated above, among other possibilities.

In 512, if a fused multiply add operation should be performed, the fused multiply add operation may be performed using a FUMA block using the first partial product, the second partial product, and the aligned addition term. Performing the fused multiply add operation may not include truncating the addition term. In some embodiments, performing the fused multiply add operation may include selecting and/or modifying outputs from the FUMA block in a first manner. More specifically, control logic may be used to determine how to manipulate the outputs of the FUMA block to produce a fused multiply add result. In this case, the outputs may be selected and/or manipulated in order to ensure that the intermediate product is not rounded.

In 514, if an unfused multiply add operation should be performed, the unfused multiply add operation may be performed using the FUMA block using the first partial product, the second partial product, and the aligned addition term. Performing the unfused multiply add operation may include truncating the addition term. In one embodiment, performing the unfused multiply add operation may include selecting and/or modifying outputs from the FUMA block in a second manner that is different from the first manner. More specifically, control logic may be used to determine how to manipulate the outputs of the FUMA block to produce an unfused multiply add result. In this case, the outputs may be selected and/or manipulated in order to ensure that the intermediate product is rounded.

In performing the fused or unfused multiply add operation the first and second partial products may not be truncated.

The FUMA block may include a second CSA, a half adder, and a plurality of carry propagate adders (CPAs). More specifically, using the FUMA block for multiply add operations may include using a second CSA to produce third and fourth CSA terms using the first partial product, the second partial product, and the aligned addition term. Additionally, using the FUMA block may include using a half adder to produce first and second half adder terms using the third and fourth CSA terms. Additionally, using the FUMA block may include using a first CPA to provide a first CPA sum using the first and second half adder terms. Finally, using the FUMA block may include using a second CPA to provide a second CPA sum using the third and fourth CSA terms. The control logic described above may use the output of the first and second CPA in selecting/modifying the results for unfused or fused multiply add operations. However, note that in some embodiments, the selection/control logic may be included in the FUMA block, as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system for implementing an unfused multiply-add instruction within a fused multiply-add pipeline, comprising:
   a multiplier tree having two inputs for receiving a first value and a second value for multiplication, wherein the multiplier tree is configured to produce a first partial product and a second partial product;
   a first carry save adder (CSA), wherein the first CSA is configured to receive the first partial product, the second partial product, and an aligned addition term, wherein the first CSA is configured to produce first and second CSA terms; and
   a fused/unfused multiply add (FUMA) block configured to perform one of an unfused multiply add operation and a fused multiply add operation, wherein the FUMA block includes:
      a second CSA configured to receive the first partial product, the second partial product, and the aligned addition term and to produce a multiply add intermediate result including third and fourth CSA terms, wherein the first partial product and the second partial product are not truncated;
      a half adder coupled to the second CSA and configured to produce first and second half-adder terms from the third and fourth CSA terms;

a first carry propagate adder (CPA) coupled to the half adder and configured to provide a first CPA sum from the first and second half-adder terms; and a second CPA coupled to the second CSA and configured to provide a second CPA sum from the third and fourth CSA terms.

2. The system of claim 1, further comprising:

control logic, wherein the control logic is configured to select and/or modify outputs from the FUMA block in a first manner when performing the unfused multiply add operation and in a second manner when performing the fused multiply add operation.

3. The system of claim 2, wherein the control logic is configured to modify outputs from the FUMA block to ensure that the intermediate result is rounded when performing the unfused multiply add operation.

4. The system of claim 1, wherein the addition term is truncated before reception by the FUMA block when performing the unfused multiply add operation.

5. The system of claim 1, further comprising a leading zero anticipator (LZA) configured to receive the aligned addition term and the first and second CSA terms and to determine the number of leading zeroes or ones within the sum of the terms, wherein the addition term is not truncated before reception by the LZA.

6. The system of claim 1, wherein the FUMA block is configured to perform the fused multiply add operation or the unfused multiply add operation based on an opcode.

7. The system of claim 1, wherein the FUMA block is configured to perform the fused multiply add operation or the unfused multiply add operation based on a mode setting.

8. A computer processor, comprising:

a fused-unfused floating point multiply-add (FUMA) pipeline configured to:
generate a fused multiply-add rounding result in response to the processor receiving a single fused multiply-add opcode; and
generate an unfused rounding result in response to the processor receiving a single unfused multiply-add opcode;

wherein the FUMA pipeline includes:

a multiplier tree having two inputs for receiving a first multiply term and a second multiply term for multiplication, wherein the multiplier tree is configured to produce the first terminal partial product and the second terminal partial product;

a first carry save adder (CSA) configured to receive, wherein the first CSA is configured to produce first and second CSA terms from the first terminal partial product, the second terminal partial product, and an aligned addition term;

a FUMA block including:
a second CSA configured to receive the first terminal partial product, the second terminal partial product, and the aligned addition term and to produce a multiply add intermediate result including third and fourth CSA terms, wherein the first partial product and the second partial product are not truncated;
a half adder coupled to the second CSA and configured to produce first and second half-adder terms from the third and fourth CSA terms
a first carry propagate adder (CPA) coupled to the half adder and configured to provide a first CPA sum from the first and second half-adder terms; and a second CPA coupled to the second CSA and configured to provide a second CPA sum from the third and fourth CSA terms.

9. The processor of claim 8, wherein, in generating the unfused rounding result, the FUMA pipeline is further configured to align the addition term to generate an aligned addition term before being combined with the first terminal partial product and the second terminal partial product.

10. The processor of claim 9, wherein, in generating the unfused rounding result, the FUMA pipeline is configured to truncate the aligned addition term.

11. The processor of claim 9, wherein the FUMA pipeline is configured to combine the aligned addition term with the first terminal partial product and the second terminal partial product to determine the number of leading zeros or ones within the sum of the terms.

12. The processor of claim 11, wherein, in determining the number of leading zeros or ones, the aligned addition term is not truncated.

13. A method for implementing an unfused multiply-add instruction within a fused multiply-add pipeline, comprising:

aligning an addition term to produce an aligned addition term;

producing, using a multiplier tree a first partial product and a second partial product from a first value and a second value;

producing, using a first carry save adder (CSA) a first and second CSA term from the first partial product, the second partial product, and the aligned addition term;

performing one of a fused multiply add operation and an unfused multiply add operation, each including:
producing, using a second CSA third and fourth CSA terms using the first partial product, the second partial product, and the aligned addition term, wherein the first partial product and the second partial product are not truncated;
producing, using a half adder first and second half-adder terms using the third and fourth CSA terms;
providing, using a first carry propagate adder (CPA) a first CPA sum using the first and second half-adder terms;
providing, using a second CPA a second CPA sum using the third and fourth CSA terms; and wherein, while performing the unfused multiply add operation, truncating the aligned addition term.

14. The method of claim 13, further comprising:
if the fused multiply add operation should be performed based on said determining, selecting and/or modifying outputs from the FUMA block in a first manner; and
if the unfused multiply add operation should be performed based on said determining, selecting and/or modifying outputs from the FUMA block in a second manner.

15. The method of claim 14, wherein said selecting and/or modifying the outputs from the FUMA block in the second manner comprises modifying the outputs from the FUMA block to produce a rounded intermediate product.

16. The method of claim 13, further comprising using a leading zero anticipator (LZA) to determine the number of leading zeroes or ones within the sum of the aligned addition term and the first and second CSA terms, wherein the addition term is not truncated before said using the LZA.

17. The method of claim 13, wherein said determining if the fused or unfused multiply add operation should be performed is based on an opcode.

* * * * *

UNITED STATES PATENT AND TRADEMARK OFFICE
CERTIFICATE OF CORRECTION

PATENT NO.        : 8,977,670 B2
APPLICATION NO.   : 13/469212
DATED             : March 10, 2015
INVENTOR(S)       : Brooks et al.

Page 1 of 1

It is certified that error appears in the above-identified patent and that said Letters Patent is hereby corrected as shown below:

In the specification

In column 5, lines 57-58, delete "("the '486 Application)," and insert -- ("the '486 Application"), --, therefor.

Signed and Sealed this
Twentieth Day of October, 2015

Michelle K. Lee
*Director of the United States Patent and Trademark Office*